United States Patent [19]
Hall et al.

[11] Patent Number: 5,564,628
[45] Date of Patent: Oct. 15, 1996

[54] PROCESS AND APPARATUS FOR CONTROLLING HIGH VEGETATIVE AND BRUSH GROWTH

[75] Inventors: Sue A. Hall, Tonawanda; Donald J. Gardner, Grand Island, both of N.Y.

[73] Assignee: Agro Statics, Inc., Grand Island, N.Y.

[21] Appl. No.: 797,177

[22] Filed: Nov. 25, 1991

Related U.S. Application Data

[63] Continuation-in-part of Ser. No. 399,888, Aug. 24, 1989, abandoned.

[51] Int. Cl.$^6$ ..................................................... B05B 9/06
[52] U.S. Cl. .................................. 239/3; 239/77; 239/704
[58] Field of Search .................................. 239/77, 78, 3, 239/690, 694, 696, 704, 706

[56] References Cited

U.S. PATENT DOCUMENTS

| | | | |
|---|---|---|---|
| 2,608,792 | 9/1952 | Chater | 239/77 |
| 2,938,672 | 5/1960 | Glatfelter | 239/77 |
| 2,975,543 | 3/1961 | Funk | 239/77 |
| 3,128,036 | 4/1967 | McBride | 239/77 |
| 3,252,656 | 5/1966 | Greenwood | 239/77 |
| 3,278,124 | 10/1966 | Wolford | 239/77 |
| 3,339,840 | 9/1967 | Point | 239/3 |
| 3,408,175 | 10/1968 | Schuh | 71/65 |
| 3,446,424 | 5/1969 | Wolford | 230/114 |
| 3,625,926 | 12/1971 | Swanson | 239/77 |
| 3,708,126 | 1/1973 | De Kinkelder | 239/590.5 |
| 3,799,758 | 3/1974 | Franz | 71/86 |
| 4,000,733 | 1/1977 | Pauly | 126/270 |
| 4,565,318 | 1/1986 | Inculet | 239/77 X |
| 4,673,132 | 6/1987 | Inculet | 239/706 |
| 4,762,274 | 8/1988 | Burls | 239/3 |

*Primary Examiner*—Kevin Weldon
*Attorney, Agent, or Firm*—Jaeckle, Fleischmann & Mugel

[57] ABSTRACT

A process and apparatus for controlling high vegetative and brush growth along a narrow, continuous strip of land along the sides of a roadway or other right-of-way comprising preparing a dilute aqueous herbicidal solution, particulating said solution into coarse or large droplets and imparting an electrostatic charge to the droplets of herbicidal solution, and spraying the particulated and electrostatically charged droplets of said solution upon a narrow, continuous strip of land along the side of a roadway with minimal encroachment of the spray upon the environmental land adjacent said strip, and apparatus for effectively and accurately performing such operations. Such apparatus comprises a motorized vehicle or platform truck upon which is mounted a supply tank for containing the herbicidal solution, means for particulating the solution into coarse droplets and imparting an electrostatic charge thereto, a verticality pivotable mounted shroud or shrouds for containing the particulating nozzles and directionally orienting a thin, fan-shaped sheet of spray against the strip of land to be treated, and a blower for dispersing a stream of air under pressure to create the fan-shaped spray of herbicidal solution and directing it against the strip of land.

2 Claims, 2 Drawing Sheets

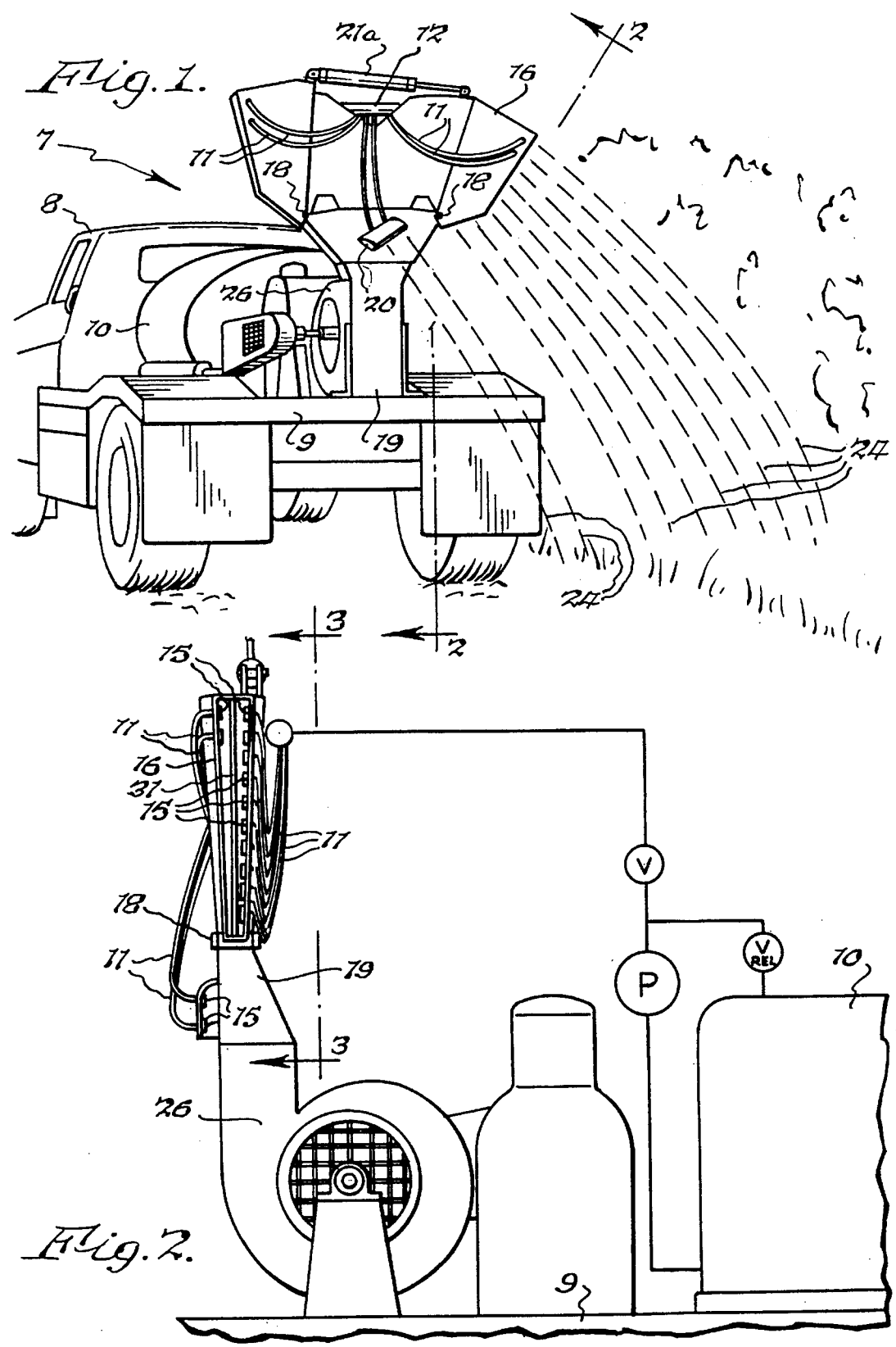

PROCESS AND APPARATUS FOR CONTROLLING HIGH VEGETATIVE AND BRUSH GROWTH

BACKGROUND

This application is a continuation-in-part application of our earlier filed patent application Ser. No. 07/399,888 filed Aug. 24, 1989 which is now abandoned.

This invention relates to an improved process and apparatus specifically designed and developed for use in reducing and controlling obnoxious high vegetation such as high grasses and weeds and heavy brush and the like along the sides of a roadway or other right-of-way in which a dilute aqueous herbicidal solution is prepared and particulated and dispersed into large or coarse droplets and an electrostatic charge imparted to the droplets, and the particulated and electrostatically charged droplets of material are sprayed along a roadside strip or zone of selected and closely controlled width up to as much as 55 feet wide while at the same time avoiding the specific problems peculiar to such roadside spraying operations that have not been met and overcome or solved by use of the conventional, prior art methods of spraying heretofore and currently disclosed and used for row crops, fruit trees and other types of pesticidal, fungicidal or herbicidal treatment. For example, the process and apparatus of the present invention have been specifically designed and developed, after several years of intensive and continued experimental operations with only partial acceptance and success, to avoid encroachment of the sprayed solution onto the adjacent environment next to the strip of land selected for treatment, without denuding the treated area of attractive low growth of clover, low grasses, and other desirable ground covers, and without sterilization of the soil.

The practice of applying pesticides, insecticides, fungicides, herbicides and other materials by the use of spraying technology has been widely carried on for over 50 years, as evidenced by the following numerous prior art U.S. Pat. Nos. Glatfelter 2,938,672, Greenwood 3,252,656, Wolford 3,278,124, Point 3,339,840, Schuh 3,408,175, Wolford 3,446,424, De Kinkelder 3,708,126, 3,799,758, Law 4,004,733, Enculet et al 4,673,132, and Burls et al 4,762,274.

One of the worst problems encountered in the prior art has been the excessive misting and atmospheric drifting of the atomized fine mist which the above-mentioned Schuh U.S. Pat. No. 3,408,175 seeks to overcome by the use of an organic polymer in the spraying solution. This problem has been so great that spraying of such atomized, fine mists of herbicidal solutions onto crops has been curtailed to a great extent and confined to fungicides and other materials less detrimental to the environment. Such atomized materials in the form of an atomized mist are made up almost entirely of very fine particles having an average particle size under 100 microns (0.1 millimeter) diameter.

The aforesaid Point U.S. Pat. No. 3,339,840 undertakes to reduce atmospheric drifting of the atomized spray by creating an extensive field extending a substantial distance to the rear of the spraying mechanism.

However, especially in the herbicidal spraying of narrow, continuous zones or strips of land along the side of a roadway to control effectively the growth of obnoxious weeds and heavy underbrush without encroaching upon the adjoining environment, none of the prior art procedures or equipment have been found suitable for the operation or fully satisfactory or completely acceptable. The material in solution form has invariably been atomized into a fine mist having an average individual particle size of substantially under 100 microns (0.1 millimeters) in diameter, and has been highly susceptible to atmospheric drifting beyond the area being treated.

The specific problems peculiar to and inherent in spraying herbicidal solutions along a roadside or other right-of-way, and especially the problem of atmospheric drifting onto the private adjoining environmental land with extreme detriment to expensive shrubbery, plants, ornamental trees and the like has been stressed in a recent publication published in August, 1991 by the New York Stage College of Agriculture and Life Sciences at Cornell University at Ithaca, N.Y. and entitled "Pesticide Applicator Training Manual Category 6 Right-of-way". The manual is a guide for professional operators who intend to apply herbicides along the sides of roadways or other right-of-ways, and repeatedly warns them of the multiple dangers of damage to adjacent private land if the operation is such as to allow improper atmospheric drifting.

SUMMARY OF THE INVENTION

We have discovered that it is absolutely essential for completely acceptable results in roadside spraying that close control and adherence to several critical parameters, the most important of which is to avoid atomizing of the solution but to keep the individual particles of the spray coarse or large within the range of 500 microns to 2500 microns in diameter, must be followed in order to meet the strict environmental demands now required, and at the same time achieve improved, effective results in obtaining the elimination of excessive weed and underbrush growth with minimal encroachment on the adjacent environment. It has required a number of innovative and unique design modifications in the spraying equipment or apparatus, and especially the disposition and arrangement of the spraying nozzles in a shroud or shrouds in order to accomplish the desired objectives and avoid the problems encountered when trying to use existing spraying systems.

OBJECTS

It is an object of the present invention to provide a process and apparatus for controlling obnoxious high vegetative growth of tall weeds and grasses and overhanging brush growth along the sides of country and suburban roads or highways with little or no encroachment upon the adjoining environment, and without denuding the treated area of attractive and desirable low growth and ground cover and without sterilization of the soil.

It is a more specific object of the present invention to provide apparatus embodying a novel type of spraying nozzle arrangement which permits the accurate directional orientation of the herbicidal solution being used to treat the narrow roadside strip with a minimal encroachment upon the adjoining environment by the sprayed solution, and by vertically pivotal adjustment of the shroud and nozzles determine and adheres closely and accurately to the width of the strip to be treated.

It is a still further object to provide a type of nozzle and shroud arrangement and conditions of use which do not atomize the solution but break the solution down and particulate it into droplets coarser in particle size than the heretofore atomized material.

These and other objects will become apparent as the description of the invention proceeds.

DETAILED DESCRIPTION OF INVENTION AND DRAWINGS

In accordance with the present invention we have discovered that in the specific herbicidal treatment of a long, relatively narrow, continuous strip or zone of land along the side of a road or right-of-way with minimal encroachment upon the sensitive surrounding and adjacent environment, apparatus had to be created that would permit close and accurate directional orientation of the herbicidal solution as it is particulated into the form of a spray during the entire operation. Also, satisfactory and acceptable results secured when such close control was exercised were made possible only by use of a nozzle and shroud with vertical flexurability of mounting, together with imparting an electrostatic charge to the particulated droplets of the herbicidal solution as they are released from the nozzles in a very dilute concentration or strength and at a low rate of application.

The present invention is primarily founded upon applicant's radical departure from all prior art teachings that atomization of the spray is essential, and the discovery and recognition that a breakdown of the herbicidal solution into coarse or large droplets having an average particle size diameter of between 500 microns (0.5 millimeters) and 2500 microns (2.5 millimeters) is necessary to practically eliminate undue atmospheric drifting. It is also to be recognized in the light of the presently disclosed concept that the gravitational pull or force upon such coarse particles still further mitigates or lessens the tendency towards undesirable atmospheric drifting.

Based upon the aforesaid discovery and recognition, applicants have found that for acceptable results the solution being sprayed should not be atomized into the fine misty particles highly susceptible to atmospheric drifting as previously invariably used in spraying operations, but should be broken down and dispersed when sprayed into large particulated droplets. We have found that when the herbicidal solution is sprayed as coarse droplets having an average particle size in the range of 500 microns (0.5 millimeter) to 2500 microns (2.5 millimeters), that it can be applied effectively even in the rain.

The invention will be better understood by reference to the accompanying drawings illustrating an embodiment of the invention, and in which:

FIG. 1 is a rear perspective view of the apparatus of the present invention or equipment as installed on a motorized highway platform truck;

FIG. 2 is a vertical side elevational view of the spraying shroud and nozzle arrangement, fan engine and supply tank, with some of the hydraulics schematically shown, and its taken along the line 2—2 of FIG. 1.

Figure 3:
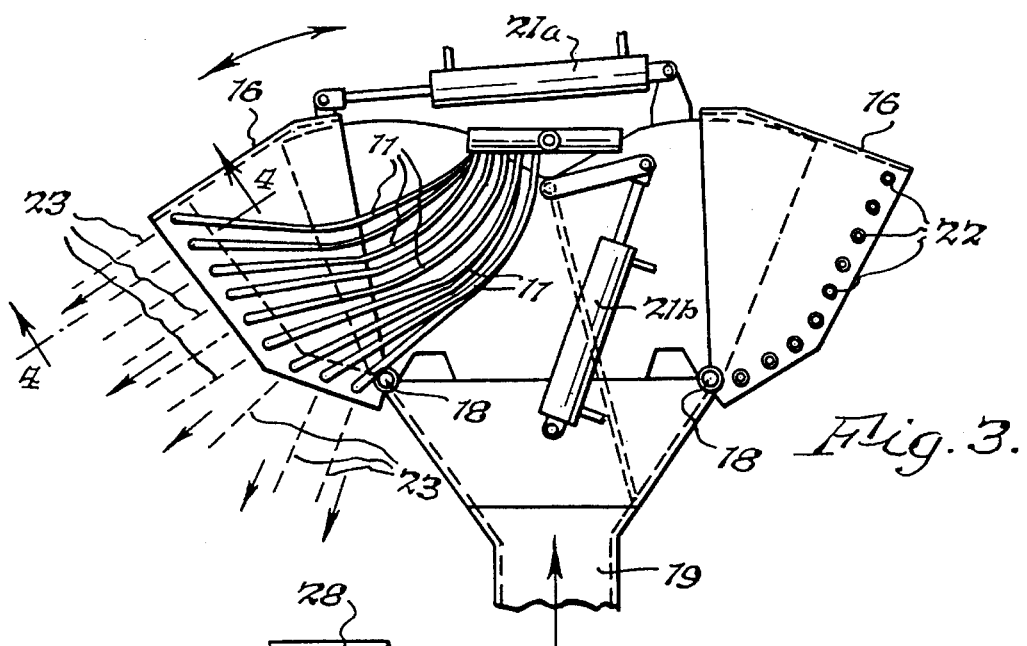
FIG. 3 is a vertical sectional view of the spray nozzle shrouds taken along the line 3—3 of FIG. 2.

Referring further to the drawings, FIG. 1 depicts a motorized road vehicle in the form of a platform truck 7 provided with a cab 8 from which the driver operates the vehicle and in which the controls are located by which the operator can exercise at all times close and accurate control over the functions of spraying equipment without personal exposure to the herbicidal material. Mounted upon the platform 9 of the vehicle is a supply tank 10 for containing a supply of dilute aqueous herbicidal solution with conduits 11 and pumping means designated as P for conveying the solution of herbicide to manifold 12. The solution is conducted from the manifold to a plurality of individual nozzles 15, the majority of which are mounted in a row in the primary or main shroud 16 which is vertically pivotable at the point 18 which is approximately 9½ feet above the ground level of the strip being treated. The shroud is supported by an upright frame or column 19. By pivoting the shroud vertically from an approximately vertical positioning of the row of nozzles to an essentially horizontal alignment of the nozzles 15, the operator can control the exact width of the strip of land to be treated. When aligned in an essentially vertical position the strip of land treated by the spray is widest, whereas as the row of nozzles is moved to a horizontal position, the strip of land being treated becomes narrower. Two additional nozzles are mounted separately in a minor rear shroud 20 so as to direct a spray of the herbicidal solution to the land located closest to the side edge of the roadway. The movement of the shrouds 16 and 20 is effected through pneumatic or hydraulic cylinders 21a and 21b.

Figure 4:
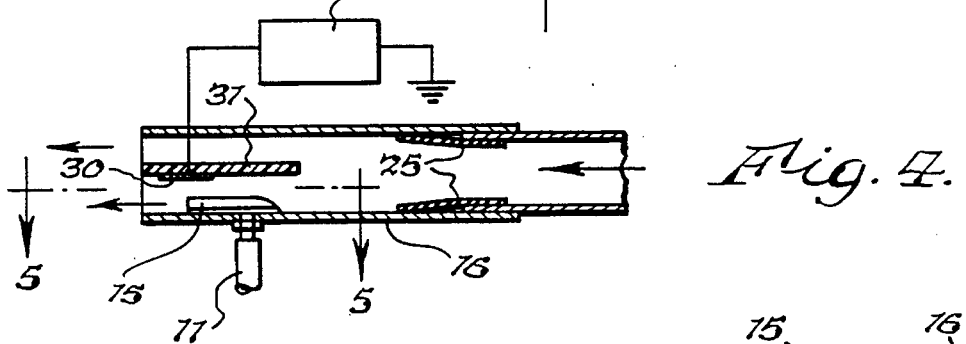
FIG. 4 is a fragmentary sectional view of the shroud, its nozzle, its electrostatic conductor and the seals used to seal the movable part of ache shroud to the stationary part.
Figure 5:
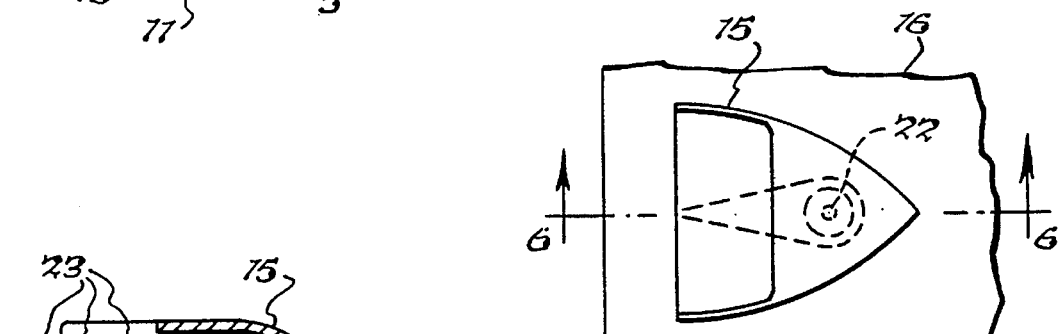
FIG. 5 is an enlarged plan view of a nozzle taken along the line 5—5 of FIG. 4.
Figure 6:
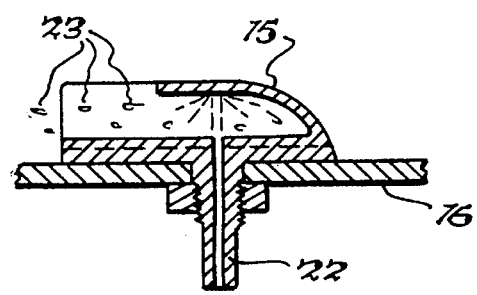
FIG. 6 is a sectional view taken along the line 6—6 of FIG. 5.

Referring more specifically to FIGS. 4, 5 and 6, the nozzles are sealably connected by seals 25 to the pressurized air duct through which air under pressure is projected by blower 26 to the nozzles into which the herbicidal solution is fed through ducts 22. The stream of pressurized air serves to break the herbicidal solution into coarse particulated droplets 23 forming the spray 24 which is projected onto the land being treated. These particulated droplets, as explained or defined in detail above, are not as fine as the atomized mists heretofore considered to be essential and consequentially are not as subject to atmospheric drifting and misting as the latter.

As shown in FIG. 4, an electrostatic charge is generated by a generator 28 and imparted by means of conductor plate 30 to the droplets of particulated herbicidal solution as they are discharged from the nozzles 15 in the form of a thin fan-shaped sheet of spray of coarse particles directed to the strip of land being treated. An insulating plate 31 is embodied in each of the nozzles to prevent electrical shortages. Using 3 to 5 pounds water pressure and the arrangement of nozzles mounted in a vertically pivotable, movable shroud with an auxiliary shroud as illustrated in the drawings, a strip of land as narrow as two feet up to a maximum width of 55 feet can be effectively treated with herbicidal solution with little or no encroachment on the adjacent environmental land by misting or atmospheric drifting. This effectiveness is still obtained when the spraying operation is carried out when it is raining.

The present process of controlling excessive vegetative and brush growth is not restricted to any one specific herbicidal material. We have found that the phenoxy herbicides are highly effective in carrying out the present invention. For example, one such phenoxy herbicide we have used with highly satisfactory results has been the butoxyethyl ester of 2,4-dichlorophenoxy acetic acid, commonly known as 2, 4D, such as that manufactured by Dow Chemical Corporation of Midland, Mich., and sold by Vertac Chemical Corporation, 5100 Poplar Avenue, Memphis, Tenn. under the brand name of Esteron 99-C. As purchased in concentrated solution for, Esteron 99-C contains:

| | |
|---|---|
| Active ingredient - Butoxyethyl ester of 2,4-Dichlorophenoxyacetic acid | 62.5% |
| Inert Ingredients | 37.5% |

The active ingredient is equivalent to 43.2% of 2,4-Dichlorophenoxyacetic acid or 3.8 pounds per gallon.

Another herbicide effective for use in carrying out the present invention is that manufactured by Monsanto Chemical Corporation of St. Louis, Mo. and available from J.C. Ehrlich Chemical Company, Inc., 840 William Lane, Reading, Pa. 19612 under the brand name of ROUNDUP. As purchased in concentrated solution form, it contains:

| | |
|---|---|
| Active ingredient - Isopropylamino salt of Glyphosate | 41.0% |
| Inert ingredients | 59.0% |

The concentrated solution as purchased contains 480 grams per liter or 4 pounds of the active ingredient isopropylamine salt of N (phosphonomethyl) glycene per U.S. gallon. This is equivalent to 356 grams per liter or 3 pounds per gallon of the acid, glyphosate.

A surfactant or adjuvant is usually used to enhance the performance of the herbicidal solution. A typical surfactant or adjuvant is that sold by Hopkins Agricultural Products of Madison, Wis. under the brand name of MAXIMIZER 420.

Other manufacturers of various herbicides are listed on pages 7065–7066 of Volume 4 of the Thomas Register of American Manufacturers for 1983.

We have prepared and used in carrying out the present process a diluted herbicidal solution of the 3 specifically identified ingredients in the following proportions:

| | |
|---|---|
| ESTERON 99-C | 3 quarts |
| ROUNDUP | 3 quarts |
| MAXIMIZER 420 | 3 quarts |
| Water | 100 gallons |

Using such a dilute aqueous solution, we have applied electrostatically charged and particulated spray with satisfactory results to a roadside strip, using 13 to 15 gallons to treat a strip one mile long averaging 45 feet in width. Depending upon the density of the foliage in the strip being treated, we can use anywhere from around 8 or even less gallons up to approximately 25 gallons to cover such an area. On the basis of 3 quarts of ESTERON 99-C and 3 quarts of ROUNDUP herbicides to 100 gallons of water, the herbicidal solution we have used effectively with excellent results is of 0.61% concentration by weight. Thus, this amounts to applying approximately 0.0066 to 0.0076 pounds of actual herbicide per gallon in the solution we have used to treat a i mile strip effectively, and when the 3 quarts of the surfactant MAXIMIZER 420 is treated as an active ingredient inasmuch as it increases the effectiveness of the herbicidal ingredients, the total active ingredients amounts to 0.008 pounds per gallon as applied, and that anywhere from around 0.4 to 1.25 pounds can be used to treat a 1 mile strip in accordance with the teachings of the present invention.

A one mile long strip having an average width of 45 feet equals 5,280 times 45 for a total of 237,600 square feet which is the equivalent of an area of about 5.5 acres.

Applicants do not wish to be bound by any theory in explaining the present invention, but they firmly believe that the genuine effectiveness of the present process and apparatus over prior unsuccessful efforts to use herbicides to control obnoxious roadside growth is due to:

a) the discovery and recognition that misting and atmospheric drifting is primarily caused by atomizing the herbicidal solution into very fine particles and that such atmospheric drifting and misting can largely be avoided by particulating and dispersing the solution into coarse or large particles or droplets which should desirably be in the average particle size range of 500 to 2500 microns (0.5–2.5 millimeters) in diameter., and b) the novel nozzle arrangement in a vertically pivotable mounted shroud or shroud so as to provide a thin sheet of fan shape of spray of particulated herbicidal material; and c) imparting an electrostatic charge to the particulated droplets as they are discharged in the form of a thin sheet of spray directionally oriented towards the strip of land being treated.

When all three of the above features are combined in the apparatus and process of the present invention, and especially the coarse particulation, satisfactory and acceptable results are obtained for the first time.

Having described the invention, it is desired to claim:

1. A process of applying a herbicide to a long, continuous strip of roadside alongside a road to control and suppress obnoxious growth of tall weeds and brush overgrowth with minimal encroachment upon the land adjoining said strip which comprises the steps of:

a) preparing a dilute aqueous herbicidal solution containing about 0.008 pounds of active herbicidal ingredients per gallon of solution;

b) particulating said herbicidal solution into large droplets and imparting an electrostatic charge to said particulated droplets as they are being released from a plurality of spraying nozzles;

c) positioning said spraying nozzles approximately 9½ feet above the ground level of the strip of land to be treated with said herbicide;

d) each of said spraying nozzles being mounted in a vertically pivotable, flexurally mounted shroud and directionally oriented so as to direct a flow of the particulated, electrostatically charged droplets in the form of a thin, fan-shaped sheet of spray onto a narrow strip of land; and e) moving the vehicle upon which the spraying equipment is mounted forward at a speed of 10 to 20 miles per hour while operating said spraying nozzles to apply said dilute solution of herbicide to the strip of land at the rate of 10 to 15 gallons per mile of treated land strip.

2. A Process according to claim 1 which the individual large droplets of particulated herbicidal solution have an average particle size of 500 microns to 2500 microns in diameter.

\* \* \* \* \*